United States Patent Office 3,351,607
Patented Nov. 7, 1967

3,351,607
PHOSPHONITRILIC POLYMERS
Bernard Grushkin, Silver Spring, Md., assignor to W. R. Grace & Co., New York, N.Y., a corporation of Connecticut
No Drawing. Filed July 28, 1964, Ser. No. 385,762
22 Claims. (Cl. 260—39)

ABSTRACT OF THE DISCLOSURE

Phosphonitrilic polymers modified by reacting with formaldehyde in the presence of a lower alkanol. The resultant polymer is thermally stable and highly crosslinked. It may be admixed with an inorganic filler prior to curing to obtain ceramic-type materials.

The present invention relates to novel phosphonitrilic compounds, and more specifically to novel organic modified phosphonitrilic polymers and to molding compositions and ceramic type materials obtained therefrom.

It has been shown the cyclic trimeric phenylsubstituted phosphonitrilic chlorides having the formula

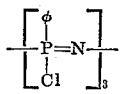

may be ammoniated with ammonia to obtain the corresponding amido derivatives having the formula

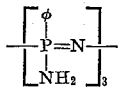

This ammoniated derivative may be deaminated at elevated temperatures to obtain a highly crosslinked inorganic type polymer which is resistant to high temperatures, but which is highly insoluble and difficult to process.

To modify the ultimate properties of inorganic type polymers and thereby extend the applications and utilities thereof, it is frequently desirable to introduce organic type linkages in a basically inorganic polymer system.

It is therefore an object of the present invention to provide novel organic modified phosphonitrilic polymers.

It is also an object to provide novel phosphonitrilic molding compositions which may be used to prepare tough, high temperature resistant, molded articles.

It is another object to provide novel ceramic type molded articles which may be prepared from the presently intended novel phosphonitrilic molding compositions.

These and still further objects of the present invention will become readily apparent to one skilled in the art from the following detailed description and specific examples.

Broadly, the present invention contemplates novel phosphonitrilic methylol derivatives having the general formula (I)

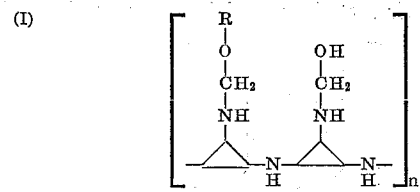

wherein n has a value of from about 5 to about 10, R represents alkyl having 1 to 4 carbon atoms, and the symbol

is used to represent a 2,4,6-triphenyltriphosphonitrilic ring having 3 open valences. The methylol derivatives of Formula I above may be heated to a temperature above about 250° C. to obtain high temperature resistant polymers containing the following structural unit:

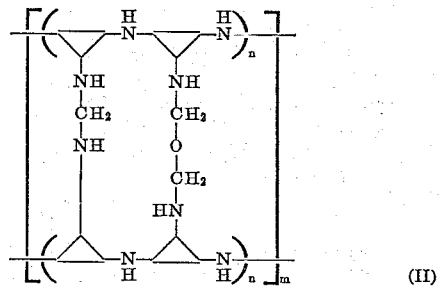

wherein $m$ has a value of at least 2 and $n$ has the value given above.

More specifically, I have found that useful organic modified phosphonitrilic derivatives having the Formula I above may be prepared by first, reacting thermally deaminated 2,4,6 - triamido-2,4,6-triphenyltriphosphonitrile having the formula

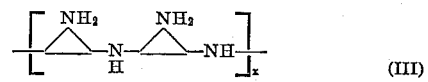

wherein $x$ has a value of 5 to 10, with formaldehyde (or a formaldehyde yielding compound) in the presence of a lower alkanol at a temperature of from about 60 to about 80° C. The resultant methylol derivative I may then be heated, i.e., cured, at a temperature in excess of about 250° C. to obtain a thermally stable highly crosslinked resin which typically contains the repeating structural unit II.

In a desired embodiment of the present invention, Compound I is admixed with an inorganic filler such as silica prior to curing. When the admixture is cured at the aforementioned temperatures, tough dense, highly stable filled resinous articles may be obtained which are stable at temperatures up to about 400° C.

In a still further embodiment of the invention, the filled molded articles obtained above are fired at temperatures in excess of 850° C. to obtain ceramic type materials having desirable physical properties.

The deaminated 2,4,6 - triphenyl-2,4,6-triamidotriphosphonitrile III used in preparation of the present methylol derivative I may be conveniently obtained by heating 2,4,6-triphenyl-2,4,6-triamidotriphosphonitrile at a temperature in excess of from about 260° C. until from about 50 to about 70% of the available ammonia present in the initial material has evolved. Such a heating step requires from about 30 to about 60 minutes at the temperatures aforementioned. When from about 50 to about 70% of the ammonia has evolved from the heated mixture, it is found that a deaminated product is obtained which contains mainly from about 5 to about 10 triphosphonitrilic units bonded through amido linkages. Extending the heating time until in excess of about 75 to about 90% of the theoretical ammonia contained in the initial material has evolved results in a highly crosslinked, insoluble type polymer which is very difficult to process.

The 2,4,6-triphenyl - 2,4,6 - triamidotriphosphonitrile may be obtained by reacting the corresponding 2,4,6-triphenyl-2,4,6 - trichlorotriphosphonitrile with ammonia, preferably in the presence of an inert solvent at a temperature of from about 15 to about 35° C.

To obtain the methylol derivatives I described herein, the deaminated 2,4,6-triamido-2,4,6-triphenyltriphosphonitrile is reacted with formaldehyde in the presence of a lower alkanol. Preferably the reaction mixture comprises from about 0.02 to about 0.06 part by weight formaldehyde per part by weight of the deaminated triphosphonitrile compound reacted therewith. The reaction mixture preferably contains from about 20 to about 50 parts by weight lower alkanol, i.e., methanol, ethanol, propanol or isopropanol, per part by weight of the deaminated product used. The reaction takes place at a convenient rate at a temperature of from about 60 to about 80° C. At this temperature from about 1 to about 2 hours are required to obtain substantial yields of the desired methylol derivative I.

The formaldehyde used in the present reaction may be conventional 37% by weight aqueous formaldehyde solution. Other formaldehyde yielding compounds such as paraformaldehyde and hexamethylenetetramine may be conveniently used. The presence of water in the reaction mixture does not detract or change the course of the desired reaction and up to about 10% by weight of water may be present in the reaction mixture. Subsequent to reaction with formaldehyde, using the conditions described above, the reaction mixture is evaporated to dryness under vacuum and the residue which is a desired reaction product is recovered. This residue is a solid material which melts at from about 235 to about 250° C. The above reaction is carried out preferably at a pH of from about 5 to about 9, obtained by addition of an inorganic base such as sodium hydroxide at the start of the initial reaction.

The methylol derivative I is subsequently cured by heating to a temperature in excess of from about 250° C. for a period of from about 30 to about 60 minutes. Frequently it is desirable to cure the above described methylol derivative I in the presence of a solid formaldehyde yielding substance, such as hexamethylenetetramine or paraformaldehyde. The hexamethylenetetramine provides an additional source of formaldehyde which may be used to react with any free amido groups khich may not have been reacted in the initial reaction step. The presence of hexamethylenetetramine or any other solid formaldehyde yielding source such as paraformaldehyde is not absolutely necessary, particularly where a thoroughly methylolated derivative is obtained from the initial reaction.

The products obtained by curing methylol derivative I typically possess the repeating structural unit II described above. These polymers may possess a molecular weight of from about 6000 to about 8000 which would indicate from about 2 to about 3 repeating units II are present in the polymers.

In a specific embodiment of the present invention the present cured products are prepared with an inorganic filler admixed therewith. It is found that many types of inorganic fillers such as finely divided silica, silica fiber, glass fibers, asbestos, metal chips and vermiculite may be advantageously admixed with methylol derivative I described above and subsequently cured to form a filled polymer having desirable physical properties. It is found that from about 60 to about 75% by weight of an inorganic filler may be advantageously admixed per part by weight of methylol I derivative prior to curing. The curing step takes place at temperatures ranging from about 230 to about 280° C., preferably under pressure. Pressures on the order of from about 1500 to about 2500 pounds per square inch may be advantageously used to obtain precision molded articles prepared from the present compositions. These articles are stable at temperatures up to about 400° C. and possess excellent physical and strength properties.

In another embodiment of the present invention the filled molded articles obtained above may be fired at temperatures of from about 850 to about 1000° C. to obtain ceramic type materials which are tough and possess desirable high temperature properties.

Having described the basic aspects of the present invention, the following examples are given to illustrate embodiments thereof.

Example I

A 13 g. sample of 2,4,6-triamio-2,4,6-triphenyltriphosphonitrile was heated at a temperature of 270° C. until 70% of the available ammonia was driven off. This resulted in 10 g. of a product having the formula

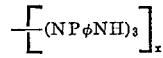

wherein $x$ has a value of from about 7 to 9. This product (10 g.) was reacted with 11.1 g. of 37% aqueous formaldehyde in the presence of 450 ml. of ethanol. The mixture was adjusted to a pH of 8 using sodium hydroxide and heated at a temperature of 75° C. for a period of 1 hour. The resultant reaction mixture was then evaporated under vacuum, and the resultant polymer was found to possess a molecular weight of 6200. It was deemed to have the repeating structural unit described in II above.

Example II

A 10 g. sample of the deaminated 2,4,6-traimido-2,4,6-triphenyltriphosphonitrile prepared in Example I was admixed with 2 g. of hexamethylenetetramine and 400 ml. of ethanol. The pH of the mixture was adjusted to 8.5 using sodium hydroxide and the mixture was heated to a temperature of 80° C. for 2 hours. The resultant product possessed a molecular weight of 5800 and was deemed to contain the repeating unit II described above.

Example III 15 g. samples of the methylol derivative obtained in Examples I and II were admixed with 2 g. of hexamethylenetetramine, then placed in a 1 x 1 x ¼ inch mold. The material was then heated to a temperature of 220–250° C. using 2000 p.s.i. pressure. The resultant molded pieces were then post cured at 280° C. for an additional 3 hours. The resultant product was found to remain stable and underwent no weight loss at temperatures up to about 400° C.

Example IV 10 g. samples obtained in Examples I and II above were admixed with 1 g. of hexamethylenetetramine and 55% by weight silica fibers. This material was then placed in a 1 x 1 x ¼ inch mold and cured under 2000 p.s.i. at temperatures ranging from 220–250° C. for about 3 hours. The resultant pieces were then post cured at 280° C. for 3 hours, whereupon it was found that strong, dense, thermally stable filled polymers, which did not undergo weight loss at temperatures up to 400° C. were obtained.

Example V

The molded articles obtained in Example IV were fired at 900° C. for about 8 hours. The resultant products were white, ceramic type articles, having extremely good thermal and mechanical properties.

The above examples clearly indicate that useful organic modified semi-inorganic phosphonitrilic polymers may be obtained by the practice of the present invention.

I claim:
1. A polymeric material containing the repeating unit

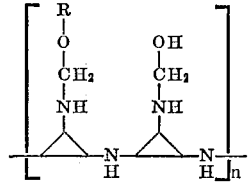

(I)

wherein

represents a 2,4,6-triphenyl substituted triphosphonitrilic residue having 3 open valences, R is an alkyl group having 1 to 4 carbon atoms, and $n$ has a value of from about 5 to about 10.

2. A polymer containing the following repeating unit

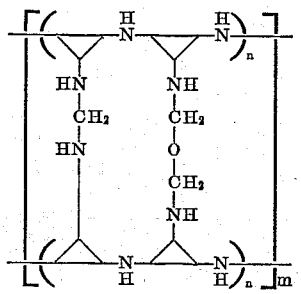
(II)

wherein

represents a 2,4,6-triphenyltriphosphonitrilic residue having 3 open valence units and $m$ has a value of at least 2, and $n$ has a value of from about 5 to about 10.

3. A polymer containing the following repeating units:

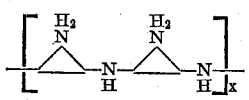

wherein

represents a 2,4,6-triphenyltriphosphonitrilic residue having 3 open valence units and $x$ has a value of from about 5 to about 10.

4. A process for preparing a polymer containing the following repeating unit:

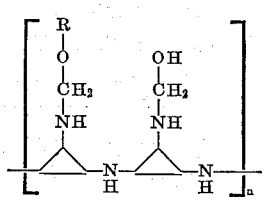
(I)

wherein

represents a 2,4,6-triphenyl substituted triphosphonitrilic residue having 3 open valences, and $n$ has a value of from about 5 to about 10, wherein a compound of the formula

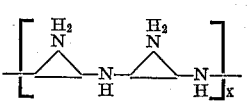

wherein

represents a 2,4,6-triphenyltriphosphonitrilic residue having 3 open valence units and $x$ has a value of from about 5 to about 10, and is reacted with formaldehyde at a temperature of from about 60 to about 80° C. in the presence of a lower alkanol having 1 to 4 carbon atoms and recovering said polymer.

5. The process of claim 4 wherein said formaldehyde is derived from hexamethylenetetramine.

6. The process of claim 4 wherein the formaldehyde is derived from paraformaldehyde.

7. The process of claim 4 in which the alkanol is ethanol.

8. A process for preparing a polymer containing the following repeating units:

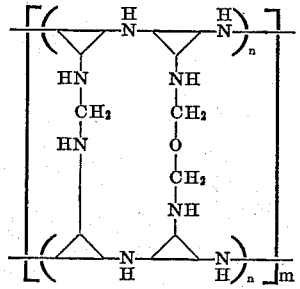
(II)

wherein

represents a 2,4,6-triphenyltriphosphonitrilic residue having 3 open valence units and $m$ has a value of at least 2, and $n$ has a value of from about 5 to about 10, which comprises heating an intial prepolymer having the formula

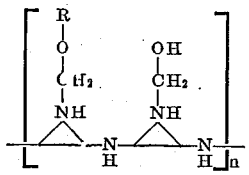
(I)

wherein

represents a 2,4,6-triphenyl substituted triphosphonitrilic residue having 3 open valences, and $n$ has a value of from about 5 to about 10, to a temperature of from about 200 to about 250° C.

9. The process of claim 8 wherein said heating is conducted in the presence of from about 0.05 to about 0.2 part by weight of hexamethylenetetramine per part by weight of said initial polymer.

10. A process for preparing a polymer of the formula

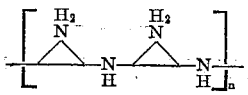

wherein

represents a 2,4,6-triphenyltriphosphonitrilic residue having 3 open valence units and $x$ has a value of from about 5 to about 10, which comprises heating 2,4,6-triamido-2,4,6-triphenyltriphosphonitrile to a temperature of from about 240 to about 260° C., until from about 50 to about 70% of theoretical ammonia in said 2,4,6-triphenyl-2,4,6-triamidotriphosphonitrile has evolved.

11. A filled a polymer molding composition comprising from about 1 to about 3.5 parts by weight of an inorganic type filler per part by weight of a polymer selected from the group consisting of

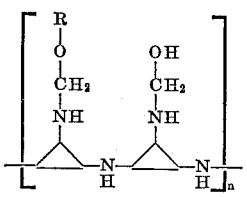

wherein

represents a 2,4,6-triphenyl substituted triphosphonitrilic residue having 3 open valences, and *n* has a value of from about 5 to about 10, and

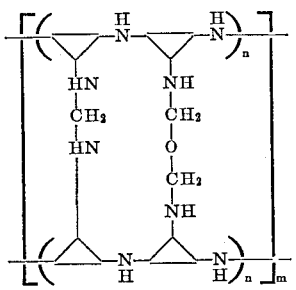

(II)

wherein

represents a 2,4,6-triphenyltriphosphonitrilic residue having 3 open valence units and *m* has a value of at least 2, and *n* has a value of from about 5 to about 10.

12. The composition of claim 11 wherein said filler is finely divided silica.

13. The composition of claim 11 wherein said filler is glass fiber.

14. The composition of claim 11 wherein said filler is vermiculite.

15. A process for preparing a high temperature resistant molded article which comprises admixing an inorganic filler with a polymer selected from the group consisting of

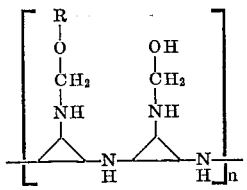

(I)

wherein

represents a 2,4,6-triphenyl substituted triphosphonitrile residue having 3 open valences, and *n* has a value of from about 5 to about 10, and

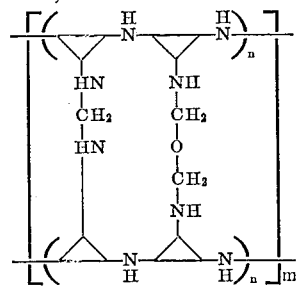

(II)

wherein

represents a 2,4,6-triphenyltriphosphonitrilic residue having 3 open valence units and *m* has a value of at least 2, and heating said mixture to a temperature of from about 230 to about 280° C.

16. The method of claim 15 wherein from about 1 to about 3.5 parts by weight of said filler is admixed per part by weight of said polymer.

17. The method of claim 15 wherein said heating is conducted under pressure of from about 1500 to about 2500 pounds per square inch.

18. The process of claim 17 wherein said filler is finely divided silica.

19. The process of claim 17 wherein said filler is glass fiber.

20. The process of claim 17 wherein said filler is vermiculite.

21. A tough ceramic material prepared by firing the molded article of claim 11 at a temperature of from about 850 to about 1000° C.

22. The ceramic of claim 21 wherein said filler is silica.

References Cited

UNITED STATES PATENTS

| | | | |
|---|---|---|---|
| 3,008,799 | 11/1961 | Paddock et al. | 23—357 |
| 3,127,234 | 3/1964 | O'Neill | 260—4 |

MORRIS LIEBMAN, *Primary Examiner.*

S. L. FOX, *Assistant Examiner.*